Aug. 18, 1959     G. R. DEMPSTER ET AL     2,900,096
FRONT END LOADERS
Filed May 28, 1957     10 Sheets-Sheet 5
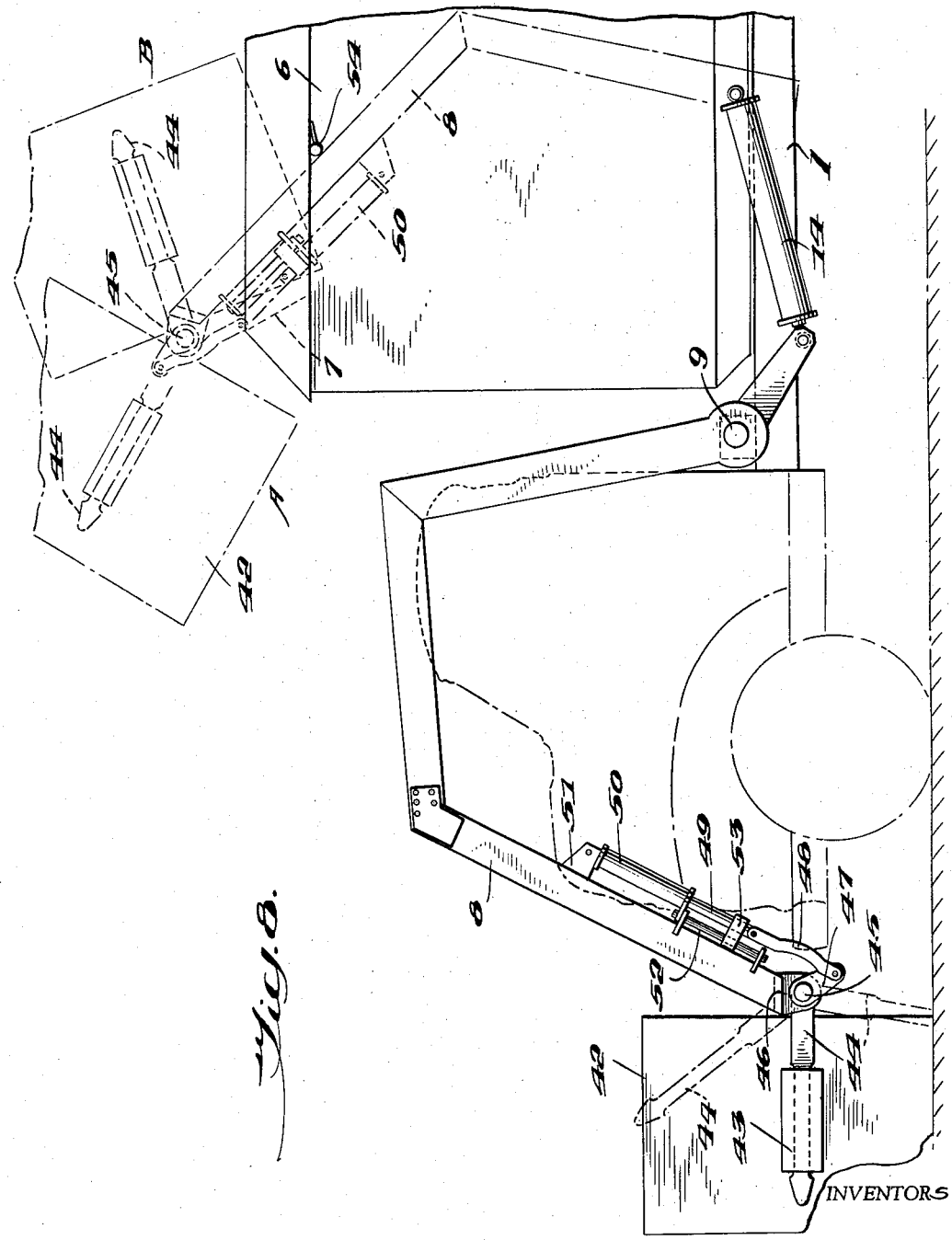
INVENTORS
GEORGE R. DEMPSTER,
WILLIAM A. HERPICH,
BY
ATTORNEYS

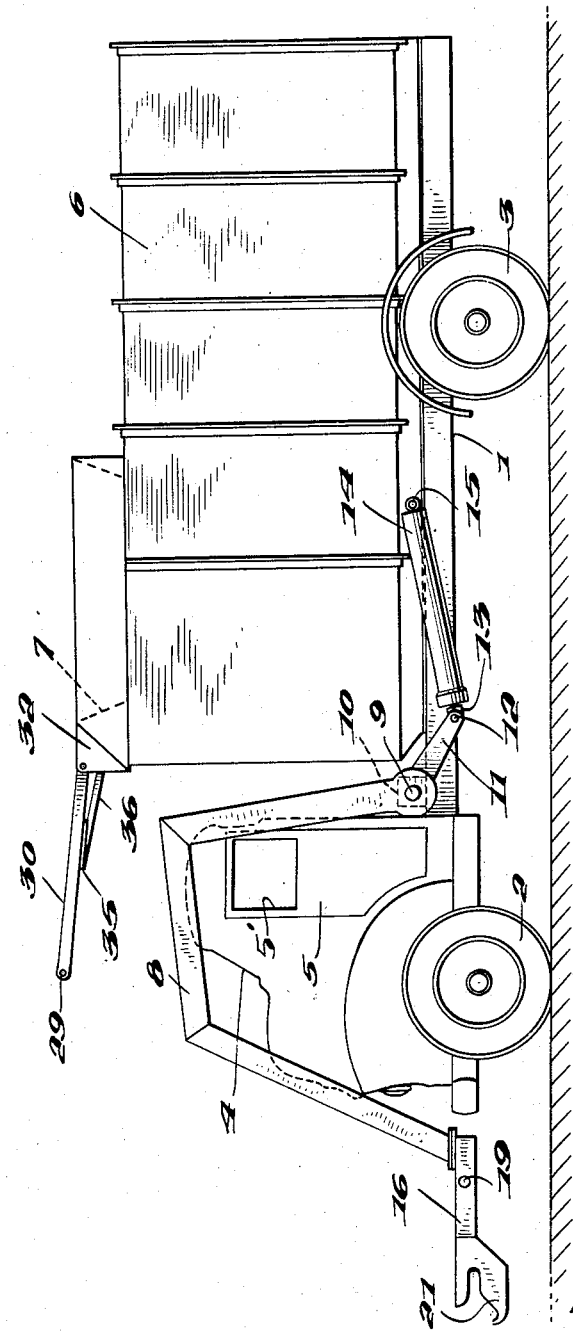

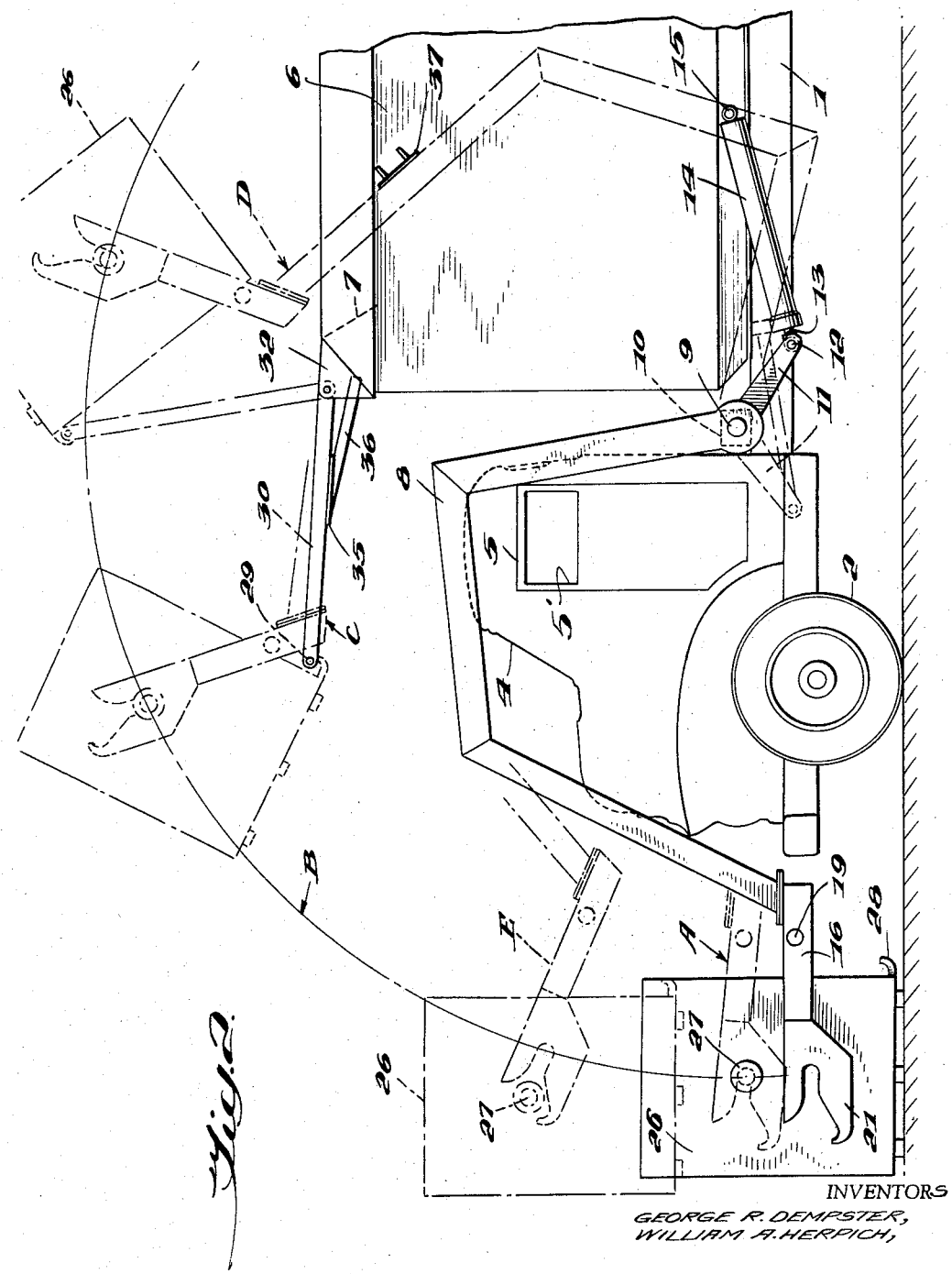

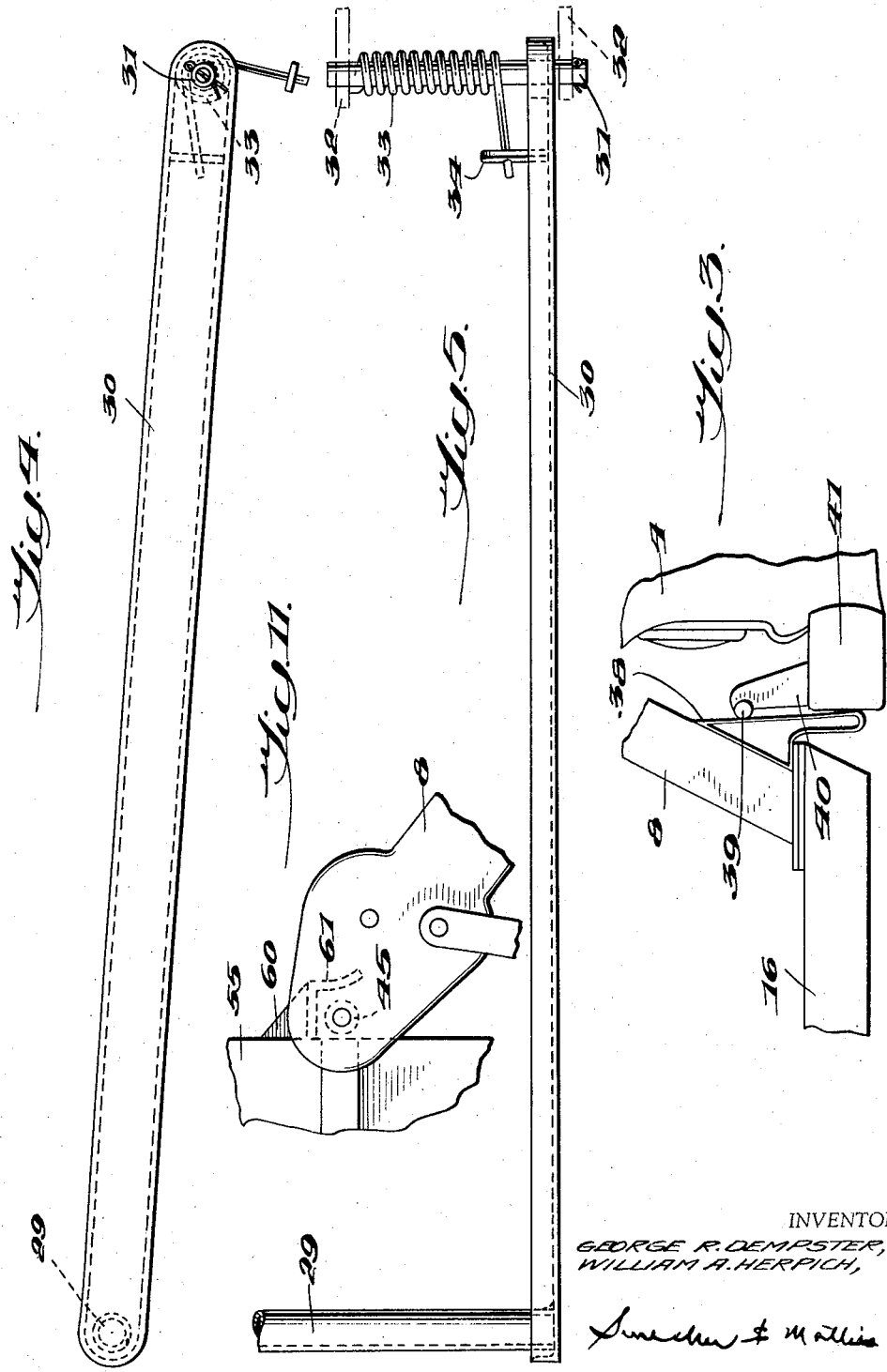

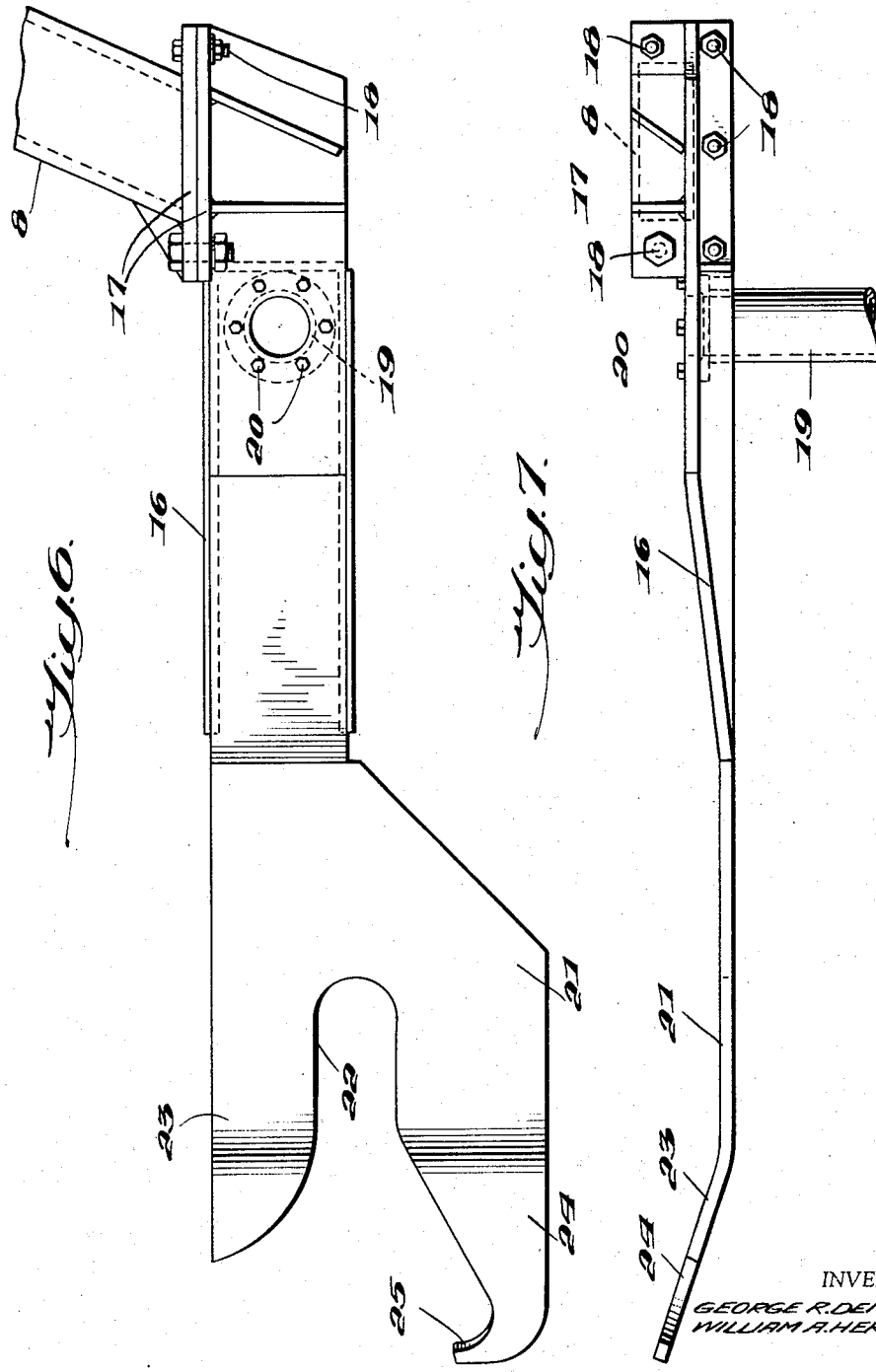

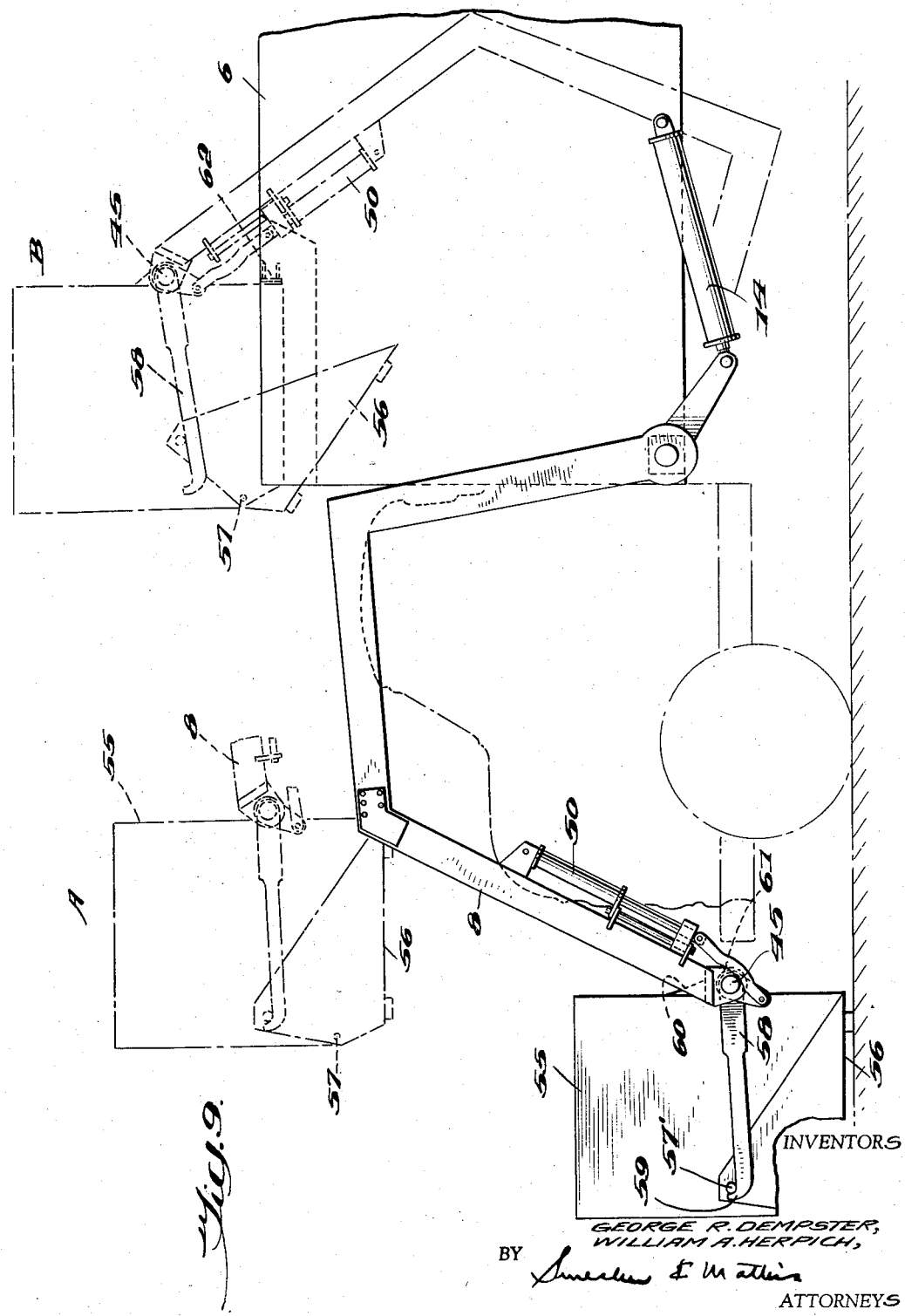

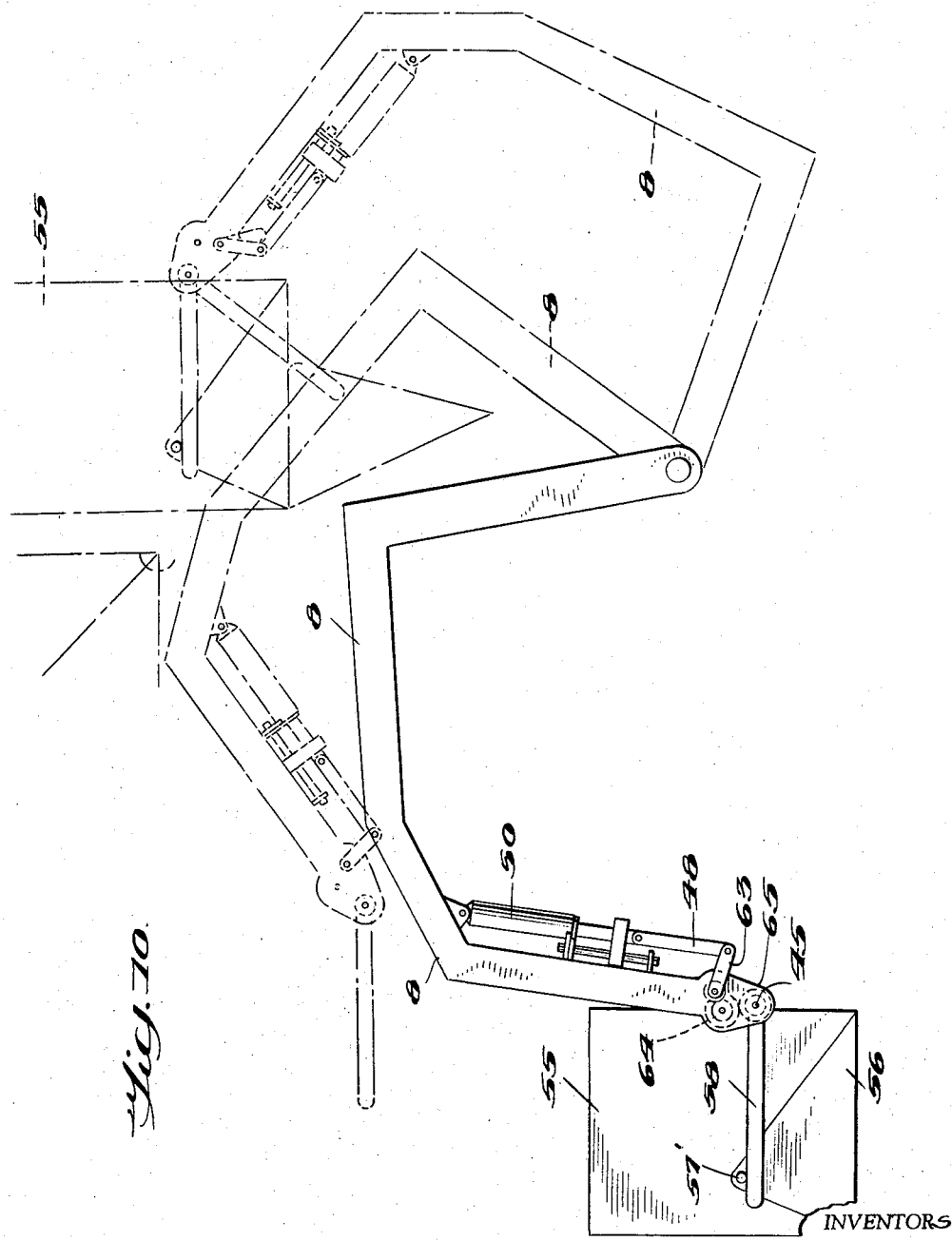

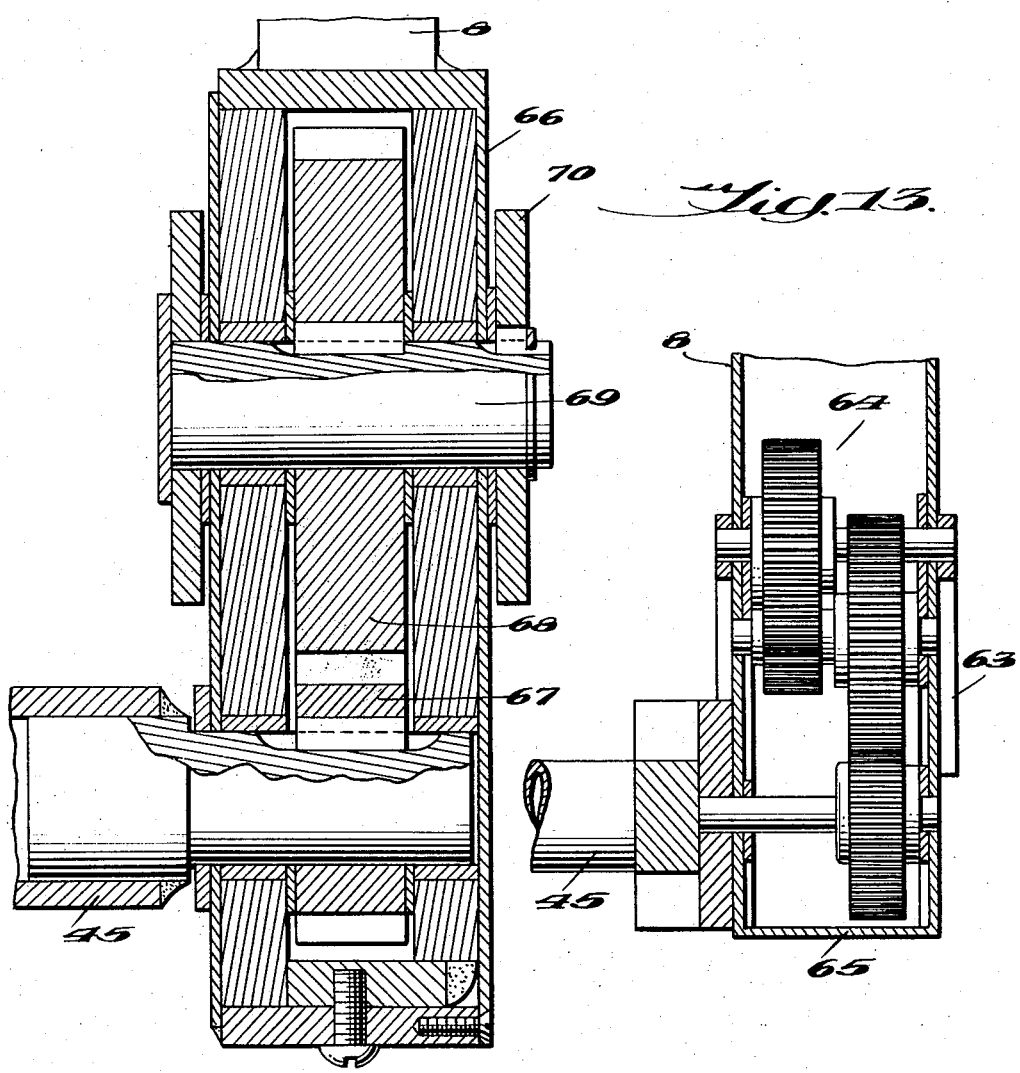

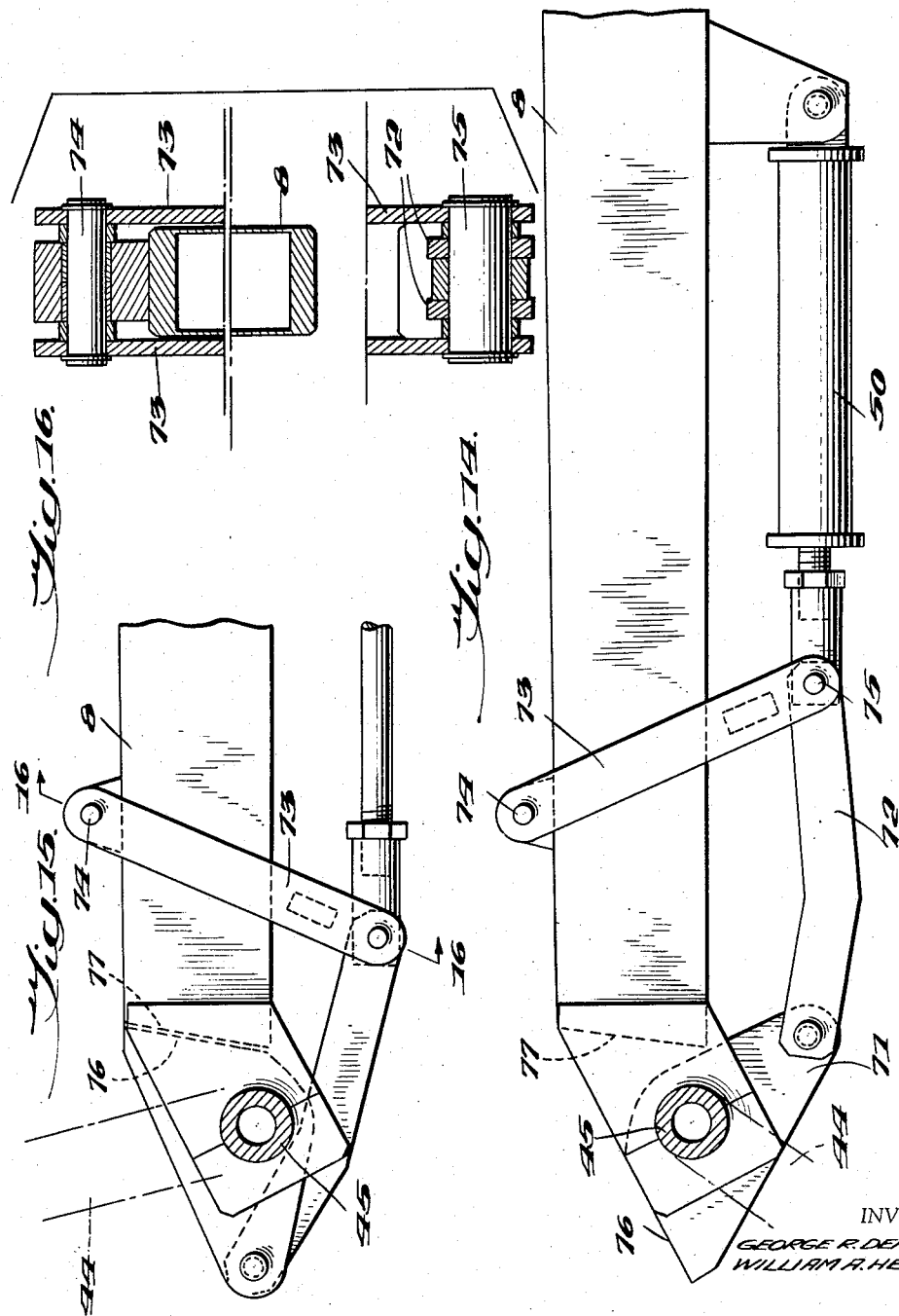

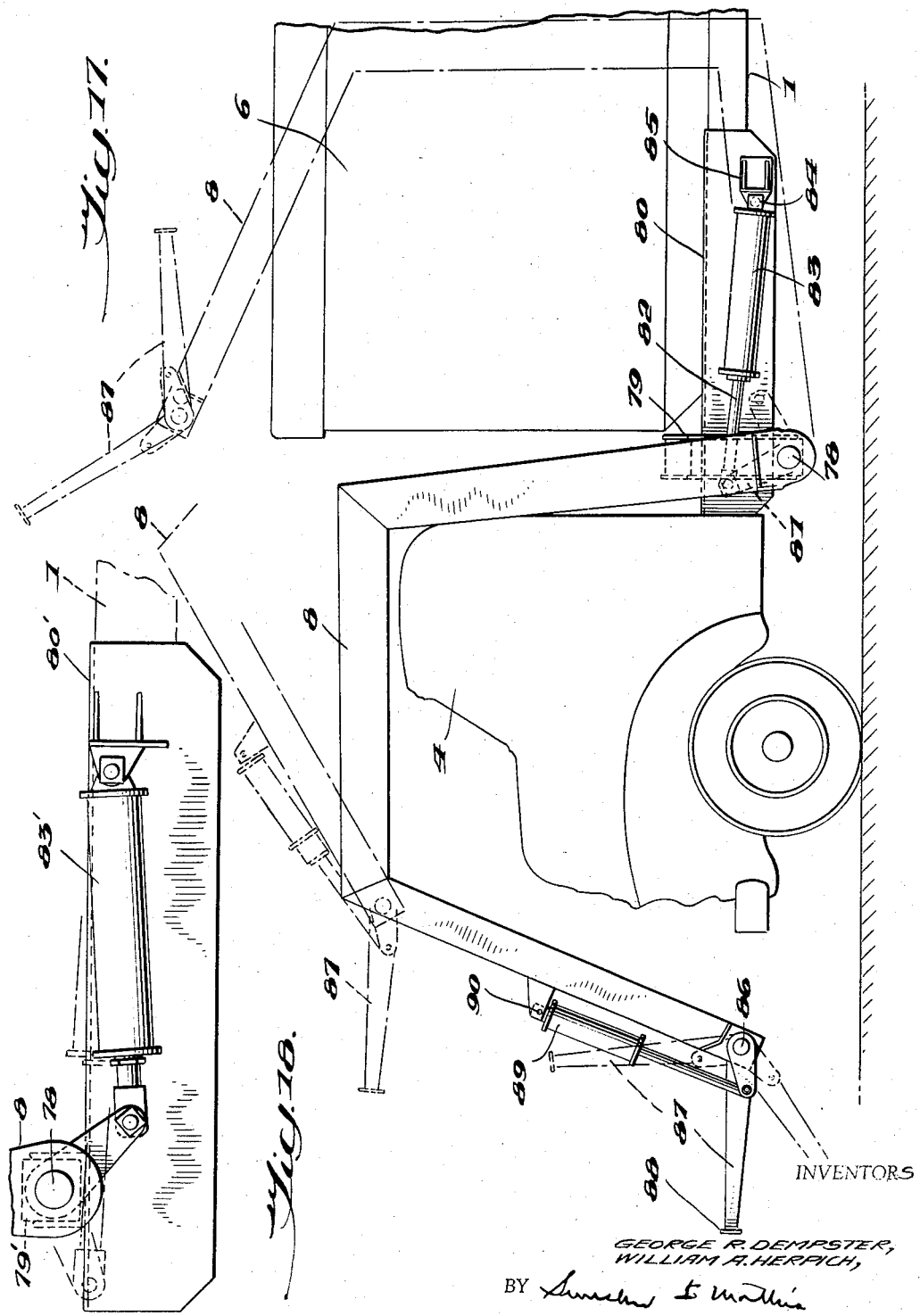

United States Patent Office 2,900,096
Patented Aug. 18, 1959

2,900,096

FRONT END LOADERS

George R. Dempster and William A. Herpich, Knoxville, Tenn.; said Herpich assignor to Dempster Brothers, Inc., Knoxville, Tenn., a corporation of Tennessee Application May 28, 1957, Serial No. 662,252

24 Claims. (Cl. 214—302)

This invention relates to improvements in front end loaders of the character used for picking up containers at the front of a motor vehicle and dumping the contents therefrom into the body of the vehicle.

It has been proposed heretofore that dumping equipment be mounted on a motor vehicle having a refuse body with a device mounted on the front portion of the vehicle adapted for engagement selectively with containers which may be approached at the front of the vehicle for picking up a container automatically and lifting the container over the front portion of the vehicle and for dumping the contents into the body. Such devices, however, as proposed heretofore, have been complex of structure and operation, expensive to manufacture and use, objectionable in the character of dumping action provided, and generally have been unsatisfactory in many respects.

It has been the usual practice to support the lifting means on arms that extend beside the cab of the truck, either outside the fenders or over the fenders in close proximity to the cab. These arms are power operated, usually my hydraulic hoists. Where the arms are located in close proximity to the lateral sides of the cab, there is serious danger of injury to the operator through the manipulation of the arms, in the event that the operator may reach out with an arm or with his head through an open window at the side of the cab.

The disposition of the lifting arms laterally on the outside of the cab is objectionable also due to the lateral restriction in the overall width of the device, especially if the width of the cab be made substantially as wide as permitted for operation over highways. It is frequently desirable that the width of the cab be increased to the maximum extent. Where such lateral dimensions are obtained in the width of the cab itself, there is not sufficient width available for the disposition of lifting arms laterally on the outside of the cab, for travel over highways as usually required. Nevertheless, no practical solution to this problem has been suggested heretofore.

One object of this invention is to overcome the foregoing objections to front end loaders as proposed or manufactured heretofore, and to improve the construction thereof.

Another object of the invention is to provide in a front end loader for the picking up and dumping of a container without interference by the lifting arms either with the operation of the vehicle or the width of the cab portion of the truck.

Still another object of the invention is to provide in a front end loader for the picking up and dumping of separate containers by lifting arms that extend in gooseneck fashion over the cab of the truck, with substantially no embracing relation of opposite sides of the cab.

Still another object of the invention is to improve the construction of front end loaders by reducing the cost of manufacture and of operation without increasing the overall width of the truck nor interfering with the operation thereof, nor risking injury to an operator in the manipulation of the loading structure.

These objects may be accomplished, according to certain embodiments of the invention, by the provision of lifting arms mounted on the truck in front of the body thereof and at the rear of the cab, but constructed in gooseneck shape so as to extend over the roof of the cab and down at the front, in such position as to pick up a separate container that may be sitting on the ground or on the supporting surface at the front of the vehicle. The pick-up operation, as well as the dumping operation, may be entirely automatic, the container being elevated to a position above the filling opening of the body and being held for dumping of the contents into the body. This action may be accomplished by hydraulic power devices or other suitable means which will provide for smooth and uniform motion of the lifting arms and container and effective discharge of the contents.

It is possible to handle many different types of containers by this assembly and to discharge the contents therefrom into the body. For example, a container may be used which requires its inversion in an elevated position for flow of the contents therefrom downwardly into the body. Another example of container is the bottom discharge type, which may be lifted into an elevated position above the filling opening of the body and the bottom thereof opened for discharge of the contents into the body. Adequate means is provided for supporting the container in the elevated position and for insuring of proper dumping thereof. Thereafter the container can be returned to its lowered position in front of the vehicle, or transported on the lifting arms to a remote point where it may be set down for refilling.

These embodiments of the invention are illustrated in the accompanying drawings, in which:

Fig. 1 is a side elevation of a vehicle having a refuse receiving body thereon and illustrating one form of front end loader mechanism that may be used in connection therewith;

Fig. 2 is a similar view, showing in dotted lines the several positions of the lifting arms and container;

Fig. 3 is an enlarged detail side elevation of the shock arrester provided on the lifting arms and vehicle;

Fig. 4 is an enlarged detail side elevation of the throw arms for dumping the container;

Fig. 5 is a partial top plan view thereof;

Fig. 6 is an enlarged detail side elevation of one of the pick up arms;

Fig. 7 is a top plan view thereof;

Fig. 8 is a side elevation of a front end loader of modified construction;

Fig. 9 is a similar view, showing a further modified form thereof;

Fig. 10 is a similar view, showing still another modified form thereof;

Fig. 11 is a detail side elevation of a portion of a container and one of the pick-up arms with the stabilizing means for the container connected therewith;

Fig. 12 is a detail cross section through one form of gearing that may be used for operating the pick-up arms;

Fig. 13 is a similar view through another form of gearing therefor;

Fig. 14 is a detail side elevation, showing one of the lifting arms and operating means mounted thereon for the pick-up arms, with the parts in one position;

Fig. 15 is a similar view, showing the parts in another position;

Fig. 16 is a cross section therethrough on the line 16—16 in Fig. 15;

Fig. 17 is a side elevation of a portion of a motor vehicle, showing a further modified form of front end loader mounted thereon; and Fig. 18 is a detail side elevation showing a further modification thereof.

The invention is shown as applied to a motor vehicle of conventional form, merely as an example of the type of vehicle on which this loading device may be used. It has been customary heretofore to utilize a vehicle chassis of the character generally indicated by the numeral 1 and which is self-propelled under control of an operator on road mounted wheels, such as the front and rear wheels indicated generally at 2 and 3. The cab is shown at 4 within which the operator is located. Usually the cab 4 has an access door 5 through each opposite side thereof, and the door 5 usually has a window 5' therein.

A refuse body is shown at 6 on the chassis 1. This may be any suitable type of body adapted to receive refuse therein, such as garbage, trash and the like, and may be of the character that is provided with packer means to compress the refuse as it is deposited in the body. It is preferred that a body be used of the type having a filling opening or hopper, indicated at 7, in the top near the front, through which the refuse may be deposited into the body. The character of the body otherwise may be varied as desired.

Referring first to the form of the invention illustrated in Figs. 1 to 7, the loader structure comprises a pair of lifting arms 8 spaced apart a distance substantially corresponding with the width of the cab 4. These arms 8 are preferably of gooseneck shape or of inverted U-shape, so as to extend over the top and downwardly in front and back of the cab 4 at the front portion of the truck, substantially as illustrated in Figs. 1 and 2. The arms should clear the cab fully and should be located within the lateral confines of the vehicle, but the dimensions of the arms should be kept as reasonably close as practicable to the sides and top of the cab. Each of the arms may be formed of fabricated structure, either square or round in cross section and preferably tubular, for sufficient strength and rigidity and yet lightness in weight, as desired.

The arms 8 extend downward at the back of the cab 4, with their lower ends fixed on a torque tube 9 extending transversely of the vehicle and suitably journaled on the chassis frame 1. Journal boxes are shown at 10 in Figs 1 and 2 for mounting the torque tube 9 on the chassis, although any suitable or desired means may be used for the purpose. Lever arms 11 are fixed on the torque tube 9 and extend downwardly therefrom. The free ends of the lever arms 11 are pivotally connected at 12 with the outer ends of piston rods 13 provided in hydraulic cylinders 14 at opposite sides of the chassis. Each cylinder 14 may be pivoted at 15 to the base of the body 6 on the chassis frame 1 in a suitable bearing bracket thereon.

At its forward end, each lifting arm 8 is connected with a pick-up arm 16, shown more in detail in Figs. 6 and 7. Each pick-up arm 16 is secured in abutting relation against the lower end of the lifting arm 8 by mounting pads 17 welded or otherwise secured to the arms 8 and 16 in position for abutment against each other, where they are held detachably in secure relation by bolts 18. Thus, the arm 16 is held rigidly to the lower end of the lifting arm 8, but is capable of ready separation and replacement when needed.

The pick-up arms 16 preferably are fabricated, as shown in Figs. 6 and 7, for sufficient sturdiness and strength according to the loads that are to be lifted thereby. These pick-up arms are braced transversely by a cross member 19 extending therebetween in abutting relation with the inner faces of the pick-up arms, as shown in Fig. 7. This cross member is detachably secure to the arm 16 by bolts 20, so as to permit of separation when it may be needed to replace one of the arms 16.

Each of the arms 16 is provided with means at the outer end thereof for engaging and lifting an adjacent end of a separate container. In the form shown in Figs. 1 to 7, this lifting means comprises a yoke, generally indicated at 21, fixed rigidly on the outer end of the arm 16. The yoke 21 comprises a plate having a recess 22 in the outer end thereof and with upper and lower tines 23 and 24 on opposite sides of the recess. The lower tine 24 has an upturned hook portion 25 on the outer end thereof for hook engagement with a lifting pin on the end of the container, as hereinafter explained, to prevent accidental displacement of the container therefrom. This lower tine preferably is bent laterally, as shown in Fig. 7, to facilitate the guiding of the lifting pin into the slot 22.

One form of container is shown in Fig. 2 and is indicated generally at 26. This form of container has closed sides and bottom and with an open top that may be provided with lids, if desired. The container is usually made of a length substantially corresponding with the width of the vehicle or the space between the lifting arms 8. Mounted on opposite ends of the container 26 are lifting pins 27.

The container 26 is also provided on the side thereof toward the vehicle with a coupling 28 to facilitate dumping. This coupling 28 is substantially a J-shaped piece fixed to the side wall or bottom of the container and projecting outwardly therefrom in a position to be disposed toward the vehicle when the loading mechanism is in position for picking up the container. One such coupling 28 may be used intermediate the length of the container, or more of these spaced at intervals therealong, if found desirable.

The coupling 28 is in position to engage a contact rod or tube 29 disposed substantially at the level of the top of the body 6, as shown in Fig. 2 and illustrated more in detail in Figs. 4 and 5. The rod or tube 29 extends transversely of the vehicle, spaced above the cab 4, and is supported at its opposite ends on lever arms 30. Each of the lever arms 30 is journaled on a hinge pin 31 that extends transversely between a pair of journal plates 32 secured to the front end portion of the body 6 at the top thereof. A torsion spring 33 is wound on the journal pin 31, being secured at one end to said journal pin and at its opposite end at 34 to the adjacent lever arm 30, normally tending to move the lever arm in a downward direction, as illustrated in full lines in Fig. 2. The lever arm 30 is adapted to be supported in its normal position upon a rest plate 35 (Fig. 2) carried by a supporting arm 36 extending outwardly from the adjacent plate 32 on the body 6 and anchored thereto.

The pick-up arms 16 are shown in full lines in Fig. 2 in their lowered positions where they may be carried, if desired, during operation of the vehicle, and to acommodate lower containers than that illustrated at 26 in the drawings. For the size of container 26, the yokes 21 would be raised, if needed, to the height of the lifting pins 27 on the container, which is the position illustrated at A in Fig. 2. With the yokes 21 in the proper position for alignment with the lifting pins 27, the vehicle can be moved forward for entry of the lifting pins on the container into the yokes. It is preferred that this position be such that the pick-up arms 16 are standing somewhat in an inclined direction at this point, whereby the weight of the container and its contents will tend to hold the container in the slots 22 in the yokes, with no danger of the container falling out of the yokes. If, however, the container should rock outward, the hook-shaped portions 25 on the tines 24 would tend to retain the lifting pins against separation from the yokes.

The arms 8 are operated by the hydraulic hoists 14 and may be moved from the pick-up position, such as that indicated at A in Fig. 2, upwardly through the arc, indicated generally at B. When the arms reach the position shown at C, the coupling 28 on the container 26 will engage the contact tube 29 which is normally held by the arms 30 in the position shown in full lines in Fig. 2. The further upward movement of the container 26 beyond the position shown at C will cause the coupling 28 on the lower end of the container to be engaged by the contact tube 29 and held thereby, so as to rotate the container on the lifting pins 27 during the continued upward movement of the arms to the dumping position indicated at D. In this position, the arms may be limited in their stroke by stop brackets 37 on opposite sides of the body 6, if needed. When the container 26 reaches the dumping position D in Fig. 2, it has been turned substantially upside down for discharging the contents through the filling opening or hopper 7 in the top of the body 6. Then, upon reversal of the hoists 14, the container is lowered and may be set down on the ground or on the floor surface for refilling. The container can be carried, either in its inverted position, as shown at D in Fig. 2, or in any desired intermediate position, elevated slightly during transportation to the point of refilling, if needed. However, the normal operation contemplates the picking up and dumping of the container at the point of filling, after which it is set down again in the same position.

Another dotted line position is indicated at E in Fig. 2, representing the position of the pick-up arms 16 when raised to engage the lifting pins of a container that is mounted at a substantial height above the surface on which the vehicle travels. For example, the container 26 may be sitting on a loading dock, as shown at the position E, and yet the pick-up arms 16 can be moved into engagement therewith for picking up the container and dumping its contents into the hopper of the body 6 in the manner illustrated in the drawings.

While the raising and lowering operation of the lifting arms 8 will be smooth and uniform under the power applied thereto by the hydraulic hoists 14, provision may be made, if desired, for absorbing the shock incident to the lowering of the lifting arms and yieldably holding these arms in their normal carrying positions. An example of such means is illustrated in detail in Fig. 3. In this embodiment, each lifting arm 8 is shown as provided with a shock arrester plate 38 depending therefrom and extending downwardly in a loop. The plate 38 is located substantially at the level of the pick-up arm 16 and in position for frictional and yieldable engagement with a tube or rod 39 mounted on a bracket 40 carried by the bumper 41 of the vehicle.

As the lifting arms 8 are lowered substantially to the full line position shown in Fig. 2, the shock arrester plate 38 engages the tube or rod 39 to transfer shock from the lifting arms to the truck body and thereby eliminate the possibility of resistance causing bending of the lifting arms. The shock arrester plate 38 travels in an arc having a center on the axis of the torque tube 9 to follow the same arc of descent as the lifting arm 8. In case of sharp resistance in engaging the container for pick up, the shock arrester plate will absorb this resistance and tend to prevent bending of the lifting arms. In most instances, the shock arrester will not be needed, but may be used where desired and where substantial resistance may be encountered.

A modified form of loading mechanism is illustrated in Fig. 8, wherein the container is indicated at 42 and is shown as of the type that is turned over for dumping, being rectangular in shape and provided with an open top. At opposite ends of the container and secured to the end walls thereof are open ended pockets 43, in position to be engaged by forks 44. The forks 44 should be elongated and of a size and shape to pass through the pockets 43 and to be retained thereby in secure connection with the container.

The forks 44 are mounted on a torque tube 45 journaled in bearing boxes 46 secured to the lower forward ends of the lifting arms 8, in place of the pick-up arms 16.

The torque tube 45 is adapted to be power operated for manipulation of the forks 44, at one or both opposite ends of the torque tube. A lever arm 47 is secured to the torque tube and extends laterally therefrom. A link 48 is pivotally connected with the outer end of the lever arm 47 at one end of the link, and extends therefrom to the adjacent end of the piston rod 49 of a hydraulic power cylinder 50. The cylinder 50 is secured by a bracket 51 on the lower side of the front end portion of the lifting arm 8, extending along the length of the arm toward the lever arm 47. The lifting arm 8 is also provided adjacent and parallel with the piston rod 49, with a guide rod 52 mounted on the arm 8 and in guiding relation with a guide block 53 secured to the piston rod 49 so as to hold the latter in proper alignment for operation of the adjacent lever arm 47.

It will be apparent from this structure that the forks 44 can be moved to several positions with respect to the torque tube 45, some of which are illustrated in dotted lines in Fig. 8, but the normal pick-up position is shown in full lines therein. The forks 44 are held by the cylinder 50 in the pick-up positions and in proper alignment with the pockets 43, so as to engage and pick up the container. Then, upon operation of the hydraulic power devices 14, as described above, the lifting arms 8 can be raised to lift the container to its dumping position and to discharge the contents therefrom.

Immediately after the forks 44 enter the pockets 43 for picking up the container, the fork arms 44 may be moved somewhat in a clockwise direction, as viewed in Fig. 8, to incline the forks and to assure of holding the latter engaged with the container. By proper control of the cylinders 50 the torque tube 45 can be turned in either direction, as indicated by dotted lines in Fig. 8. Thus, the container may be held substantially upright during movement from the full line position to the position A in Fig. 8, by properly manipulating the supply of fluid to the cylinders 50 so as to effect rotary movement of the torque tube 45 during the upward swinging movement of the lifting arms 8. Then, when the lifting arms have been raised to their dumping positions, as indicated in dotted lines in Fig. 8, the container 42 will be initially in the left hand dotted line position indicated A in Fig. 8, and upon operation of the cylinder 50 to force the piston therein toward the end of the lifting arm 8, the forks 44 will be rotated around the axis of the torque tube 45 to move the container to the second dotted line position indicated at B. This movement will be sufficient to turn the container substantially upside down for discharge of the contents through the hopper or opening 7 in the body 6. During this action, the arms 8 are held in their extreme position by stop arms 54 secured on the sides of the body 6.

After dumping of the contents, the hydraulic cylinders 50 are operated again in a direction to draw inward on the piston rods 49 thereof and thus rotate the forks 44 back to the positions which will dispose the container 42, as indicated at A in Fig. 8. Then, the lifting arms 8 can be lowered to set the container down for refilling.

This modified form of loader mechanism may be used also with a drop bottom container, if desired, as illustrated in Fig. 9. In this form, the container is illustrated at 55 and is provided with a bottom discharge door 56 hinged to the body of the container at 57. The bottom discharge door 56 is provided with upstanding portions thereof, either embracing opposite ends of the body portion or extending into notches therein. These upstanding portions are provided with lifting pins 57' connected with the bottom discharge door 56 and located at opposite ends of the container.

The forks 44, shown in Fig. 8, are replaced by pick-up arms 58 secured rigidly to the torque tube 45 and extending outwardly from the adjacent lower ends of the lifting arms 8 in positions to embrace the container at opposite ends thereof. The outer ends of the pick-up arms 58 are provided with upturned hook portions 59 in position to engage under the lifting pins 57 for retaining the latter on the pick-up arms 58.

At the side of the container 55 toward the vehicle and secured to the body thereof is a bracket 60 carrying a down-turned hook 61 (Fig. 11) in position to engage over the torque tube 45 to hold the body portion of the container in upright relation with respect to the lifting arms 8.

The pick-up arms 58 should be lowered sufficiently to pass under the lifting pins 57' on the container 55 when the vehicle is moved into pick-up position. This may be done either by rotating the torque tube 45 or by lowering the lifting arms 8. Then the raising of the lifting arms and holding the pick-up arms 58 substantially in the position shown in full lines in Fig. 9 will hold the bottom discharge door 56 closed during lifting of the container to its dumping position, as will be apparent from the dotted line positions shown in Fig. 9.

The first dotted line position indicated at A is an intermediate position when the lifting arms 8 have been raised about midway to dumping position by the operation of the hoists 14. Then, upon continuing this movement of the lifting arms 8, the container 55 will be moved to the position indicated at B in dotted lines, where the face of the container, at its open lower end, will engage an abutment 62 on the refuse body 6 at the open end thereof, thus tending to stabilize the body portion during opening of the drop bottom door 56. With the container thus held in its upright position in the opening or hopper of the refuse body 6, manipulation of the hoists 50 will rotate the torque tube 45 in a direction to lower the pick-up arms 58 and thereby allow the bottom discharge door 56 to fall open, swinging about the hinge 57. The contents can fall out of the container into the body 6 on the vehicle.

Upon reversal of the operation of the hoists 50, the pick-up arms 58 can be moved upward to close the bottom discharge door 56 and to hold this door closed as the container 55 is returned to its filling position on the ground or other surface. The return movement will be accomplished by operation of the hydraulic power devices 14, moving the lifting arms 8 from the dotted line position shown in Fig. 9 to the full line position therein.

Substantially this same operation is illustrated in Fig. 10, somewhat diagrammatically, for picking up and dumping a drop bottom container. In this modification, however, instead of the hydraulic cylinders 50 being connected directly by lever arms with the opposite ends of the torque tube 45, gearing is utilized to transmit the movement of the hydraulic power devices to the torque tube 45 and thereby to the pick-up arms 58. The lower end of the link 48 on each cylinder 50 is pivotally connected with a lever arm 63 operatively connected through a train of gears 64 in a housing 65 on the free end of each lifting arm 8 and which train of gears 64 is connected with the torque tube 45 (Fig. 13). Thus, upon operation of the hydraulic power devices 50, the pick-up arms 58 are moved about the axis of the torque tube 45 to engage the lifting pins 57' and hold the drop bottom door closed, except during dumping.

As illustrated in Fig. 13, the train of gears 64 are shown as enclosed within a housing 65 secured to the lower end of the lifting arm 8. These gears are so constructed as to reduce the length of movement of the lever arm 63 in transmitting movement to the pick-up arms 58. Any suitable or desired relative motion may be used for this purpose according to the actions to be obtained therewith.

A modified set of gears is illustrated in Fig. 12 for operating the torque tube 45. This modified set of gears is mounted on the lower end of each of the lifting arms 8 and is connected with the adjacent end of the torque tube. In this form, each end of the torque tube extends into a housing 66 secured to the lower end of the lifting arm 8, with a pinion 67 mounted thereon in mesh with a gear 68 on a stub shaft 69. The stub shaft is journaled at opposite ends in the housing 66, and at one end is connected with a lever arm 70 adapted to be actuated by the hydraulic cylinder 50, as described above.

A further modification of the actuating means for the pick-up arms 44 is illustrated in Figs. 14 to 16. Each of the pick-up arms 44 is fixed rigidly to the torque tube 45, as described above in connection with Fig. 8, the torque tube being journaled in suitable bearings provided on the free lower ends of the lifting arms 8.

Connected with the torque tube 45, at one or both of the ends thereof, is a lever arm 71 connected by a link 72 with the piston of the power cylinder 50. The link 72 is carried by a pair of suspension links 73 pivotally supported at 74 on the adjacent lifting arm 8. The links 73 extend downward from the pivot 74 to a pivot bearing 75 that extends through the connection between the piston rod of the cylinder 50 and the link 72, supporting the link and maintaining it in proper alignment for assuring smooth operation of the lever arm 71 upon actuation of the cylinder 50.

The lever arm 71 has a beveled outer edge 76 in position for complementary engagement with a beveled end 77 on the lifting arm 8 to form a stop for limiting the travel of the lever arm 71 and of the connected pick-up arm 44.

In the further modification illustrated in Fig. 17, each of the lifting arms 8 is constructed to clear the cab 4 of the vehicle extending over the top thereof and within the lateral confines of the vehicle and preferably within the lateral confines of the cab.

The rear end of each lifting arm 8 is mounted on a torque tube 78 supported by bearing assembly 79 on a subframe assembly 80 which is mounted on the chassis frame 1 of the vehicle. This mounting provides for location of the torque tube 78 below the chassis frame 1 and may extend transversely beneath the latter from side to side of the vehicle for mounting of the respective lifting arms 8 on opposite ends of this torque tube.

The lever arm 81 connected with the torque tube 78, preferably at each opposite end thereof, extends upwardly on the inner side of the adjacent lifting arm 8 and is pivotally connected with the adjacent end of the piston rod 82 of a hydraulic cylinder 83 which corresponds with the cylinder 14 in Figs. 2 and 8. The rear end of the cylinder 83 is pivotally connected at 84 with a bracket 85 mounted on the subframe assembly 80 so as to permit of vertical rocking movement of the cylinder 83 in response to swinging movement of the lever arm 81 for imparting the required movements to the latter to actuate the lifting arm 8 at the adjacent side of the vehicle.

Mounted on the forward end of each lifting arm 8 is a torque tube 86 which carries a pair of pick-up arms 87, each of which has a surrounding flange 88 on the forward end thereof in position to enter the channel or guide on the adjacent end of the container, an example of which channel was illustrated at 43 in Fig. 8. The pick-up arms 87 are actuated by a hydraulic cylinder 89 pivotally mounted at 90 on the outer side of the adjacent lifting arm 8. In this instance, the location of the cylinder is away from the cab of the vehicle where the cylinder and actuating means are free from any likelihood of striking against a portion of the cab during operation of the equipment.

The operation of this form of the invention will be apparent from the description above with respect to Figs. 8 and 9 inasmuch as they function in substantially the same manner as described in connection therewith.

A further modification is shown in Fig. 18, in which the torque tube 78 is mounted in bearings 79' supported above the chassis frame 1 upon a subframe assembly 80'. Thus, the torque tube 78 extends across over the chassis frame from side to side thereof for mounting the lifting arms 8 on opposite ends thereof. In this form the torque tube 78 is actuated by hydraulic cylinders 83' connected therewith and with the subframe assembly 80' in the manner described above in connection with Fig. 17 and as will be apparent from the drawings. Either of the locations described may be used, according to the construction of the vehicle and the available space as found desirable.

With these, as well as the other forms of the invention, as illustrated and described, it is possible for the pick-up arms to engage and dump a container automatically, with the container sitting on the ground or other surface in front of the vehicle or at any desired elevation above the surface on which the vehicle rests. For example, the container may be sitting on a loading dock at a height of several feet above the vehicle and yet the pick-up arms can be moved into engagement therewith for lifting and dumping the container into the body of the vehicle.

In all instances, the lifting arms 8 are shaped in the form of a gooseneck, so as to extend over the top of the cab 4 of the vehicle, leaving the side doors 5 and the windows 5' thereof free of obstruction. Not only does this permit of freedom of ingress and egress, but it also avoids the danger to the truck operator through manipulation of the lifting arms. At the same time, the mechanism provides for smooth and uniform operation in picking up and dumping a container and returning it to its filling position on the ground or other surface.

The construction is materially simplified, as well as improved, and does not require the manipulation of separate sections of lifting arms, but on the contrary the lifting arms can be kept in sturdy and rigid fashion due to their substantially integral construction.

While the invention has been illustrated and described in certain embodiments, it is recognized that other variations and changes may be made therein without departing from the invention as set forth in the claims.

We claim:

1. In a front end loader of the character described, the combination with a motor vehicle chassis including a chassis frame, a cab and a refuse body on the chassis frame, of loading mechanism on the vehicle comprising a pair of lifting arms of gooseneck shape extending over the top of the cab and downwardly at the front and back thereof, means pivotally mounting the rear lower end portions of the lifting arms on the vehicle for upward swinging movement, power means connected with the lifting arms for causing upward lifting movement thereof, pick-up arms supported by the front end portions of the lifting arms and having means thereon for detachable engagement with a container to lift the container to an elevated position over the body and for dumping the contents thereof into the body, a torque tube journaled on the lifting arms and supporting the pick-up arms, and means for rotating the torque tube to move the pick-up arms to different positions with respect to the lifting arms.

2. In a front end loader of the character described, the combination with a motor vehicle chassis including a chassis frame, a cab and a refuse body on the chassis frame, of loading mechanism on the vehicle comprising a pair of lifting arms of gooseneck shape extending over the top of the cab and downwardly at the front and back thereof, means pivotally mounting the rear lower end portions of the lifting arms on the vehicle for upward swinging movement, power means connected with the lifting arms for causing upward lifting movement thereof, pick-up arms supported by the front end portions of the lifting arms and having means thereon for detachable engagement with a container to lift the container to an elevated position over the body and for dumping the contents thereof into the body, a torque tube journaled on the lifting arms and supporting the pick-up arms thereon, a power device mounted on one of the lifting arms, and means operatively connecting the power device with the torque tube for swinging the pick-up arms relative to the lifting arms.

3. In a front end loader of the character described, the combination with a motor vehicle adapted to receive a body thereon for refuse, said vehicle including an operator's cab and front wheel fenders, of loading mechanism comprising a pair of lifting arms extending over the cab substantially at the lateral margins of the cab and within the lateral margins of the fenders, said arms extending downwardly at the front and back of the cab, means pivotally mounting the arms on the vehicle for upward swinging movement relative thereto, a torque tube extending between the forward end portions of the lifting arms, fork arms mounted on the torque tube for detachable engagement with a container, and power means operatively connected with the torque tube for swinging the fork arms relative to the lifting arms.

4. In a front end loader of the character described, the combination with a motor vehicle adapted to receive a body thereon for refuse, said vehicle including an operator's cab and front wheel fenders, of loading mechanism comprising a pair of lifting arms extending over the cab substantially at the lateral margins of the cab and within the lateral margins of the fenders, said arms extending downwardly at the front and back of the cab, means pivotally mounting the arms on the vehicle for upward swinging movement relative thereto, a torque tube extending between the forward end portions of the lifting arms, fork arms mounted on the torque tube for detachable engagement with a container, and power means mounted entirely on the lifting arms and operatively connected with the torque tube for swinging the fork arms relative to the lifting arms.

5. In a front end loader of the character described, the combination with a motor vehicle chassis having a body thereon adapted to receive material therein adjacent the front thereof, said vehicle chassis having an operator's cab thereon in front of the body, a loading mechanism on the chassis comprising a pair of arms extending over the cab adjacent opposite sides thereof, each of the arms including forward and rearward end portions in permanent rigid relation to each other and extending downwardly to points adjacent the vehicle chassis appreciably below the top of the cab, fork members connected with the front end portions of the arms adapted to engage and lift a container, and means mounting the arms on the vehicle chassis adjacent the rear of the cab.

6. In a front end loader of the character described, the combination with a motor vehicle of the type having a chassis frame, a body on the frame adapted to receive material therein, and an operator's cab on the frame in front of the body, of a loading mechanism comprising a pair of rigid lifting arms pivotally mounted on said vehicle for swinging movements about a substantially horizontal axis located rearwardly of said cab at a level below the top of said cab, means for swinging said lifting arms simultaneously about said axis between a lowered position in which said lifting arms extend forwardly to a location in front of said cab and a raised position in which said arms extend upwardly to a location near the top of said body, pick-up arms supported by the front end portions of said lifting arms for swinging movement about a horizontal axis extending transversely between the front end portions of said lifting arms located forwardly of all portions of said vehicle and substantially at the level of the chassis frame in the lowered position of said lifting arms, whereby the vehicle can approach a container seated on a supporting surface at the front of the vehicle so as to bring said last-mentioned horizontal axis close to said container, said pick-up arms being adapted for detachable engagement with the container disposed in front of said vehicle for lifting the container upon swinging movement of said lifting arms, and means for swinging said pick-up arms relative to said lifting arms to dump the contents of the lifted container into the body.

7. In a front end loader of the character described, the combination with a motor vehicle of the type having a chassis frame, a body on the frame adapted to receive material therein, and an operator's cab on the frame in front of the body, of a loading mechanism comprising a pair of rigid lifting arms pivotally mounted on said vehicle for swinging movements about a substantially horizontal axis located rearwardly of said cab at a level below the top of said cab, means for swinging said lifting arms simultaneously about said axis between a lowered position in which said lifting arms extend forwardly to a location in front on said cab and a raised position in which said arms extend upwardly to a location near the top of said body, pick-up arms supported by the front end portions of said lifting arms for swinging movement about a horizontal axis extending transversely between the front end portions of said lifting arms located forwardly of all portions of said cab and said chassis frame and substantially at the level of the chassis frame in the lowered position of said lifting arms, said pick-up arms being adapted for detachable engagement with a container disposed in front of said cab for lifting the container upon swinging movement of said lifting arms, means for swinging said pick-up arms relative to said lifting arms to dump the contents of the lifted container into the body, resilient shock absorber means carried by said front end portions of said lifting arms, and abutment means carried by said chassis frame in position to be contacted by said resilient means when said lifting arms are lowered.

8. In a front end loader of the character described, the combination with a motor vehicle of the type having a chassis frame, a body on the frame adapted to receive material therein, and an operator's cab on the frame in front of the body, of a loading mechanism comprising a pair of rigid lifting arms pivotally mounted on said vehicle for swinging movements about a substantially horizontal axis located rearwardly of said cab at a level below the top of said cab, means for swinging said lifting arms simultaneously about said axis between a lowered position in which said lifting arms extend forwardly to a location in front of said cab and a raised position in which said arms extend upwardly to a location near the top of said body, pick-up arms supported by the front end portions of said lifting arms for swinging movement about a horizontal axis extending transversely between front end portions of said lifting arms located forwardly of all portions of said vehicle and substantially at the level of the chassis frame in the lowered position of said lifting arms, the axis of swinging movement of the pick-up arms located in front of the vehicle being close to said container, a separate container having connection means on the ends thereof, said pick-up arms being adapted for detachable engagement with said connections on the container when the container is disposed in front of said vehicle for lifting the container upon swinging movement of said lifting arms, and means for swinging said pick-up arms relative to said lifting arms to dump the contents of the lifted container into the body.

9. In a front end loader of the character described, the combination with a motor vehicle of the type having a chassis frame, a body on the frame adapted to receive material therein, and an operator's cab on the frame in front of the body, of a loading mechanism comprising a pair of rigid lifting arms pivotally mounted on said vehicle for swinging movement about a substantially horizontal axis located rearwardly of said cab at a level below the top of said cab, means for swinging said lifting arms simultaneously about said axis between a lowered position in which said lifting arms extend forwardly to a location in front of said cab and a raised position in which said arms extend upwardly to a location near the top of said body, pick-up arms supported by the front end portions of said lifting arms for swinging movement about a horizontal axis extending transversely between front end portions of said lifting arms located forwardly of all portions of said cab and said chassis frame and substantially at the level of the chassis frame in the lowered position of said lifting arms, a separate container having connection means on the ends thereof, said pick-up arms being adapted for detachable engagement with said connections on the container when the container is disposed in front of said cab for lifting the container upon swinging movement of said lifting arms, and means for swinging said pick-up arms relative to said lifting arms so as to maintain the container in a substantially upright position while said lifting arms move the container over the front of the body and then to dump the contents of the lifted container into the body.

10. In a front end loader of the character described, the combination with a motor vehicle of the type having a chassis frame, a body on the frame adapted to receive material therein, and an operator's cab on the frame in front of the body, of a loading mechanism comprising a pair of rigid lifting arms pivotally mounted on said vehicle for swinging movements about a substantially horizontal axis located rearwardly of said cab at a level below the top of said cab, means for swinging said lifting arms simultaneously about said axis between a lowered position in which said lifting arms extend forwardly to a location in front of said cab and a raised position in which said arms extend upwardly to a location near the top of said body, a torque tube rotatably mounted on and extending between the front end portions of said lifting arms, said torque tube being located in front of said cab substantially at the level of the chassis frame in the lowered position of said lifting arms, fork arms mounted on said torque tube for detachable engagement with a container disposed in front of said cab for lifting the container upon swinging movement of said lifting arms, and power means operatively connected to said torque tube for swinging said fork arms relative to said lifting arms to dump the lifted container into the body.

11. In a front end loader of the character described, the combination with a motor vehicle of the type having a body adapted to receive material therein and having in front of the body an operator's cab with wheels on opposite sides thereof near the front end thereof, of a loading mechanism comprising a pair of rigid lifting arms each having a rigid end portion pivotally mounted on said vehicle for swinging movements about a substantially horizontal axis located rearwardly of said cab, and each arm having a separate end portion rigid with the first-mentioned end portion and spaced from said pivotal mounting on the vehicle, means for swinging said lifting arms about said axis between a lowered position in which said last-mentioned end portions of said arms extend forwardly to a location below the tops of said wheels and in front of said cab and a raised position in which said last-mentioned end portions of said arms extend upwardly to a location near the top of said body, each of said arms being of a rigid angular configuration such that, in its lowered position, it extends over the top of the adjacent wheel and its front end portion extends downwardly to said location below the top of the wheel and in front of the cab, and means on the front portions of said arms for detachable engagement with a container to lift the container upon swinging movement of the arms and dump the contents therefrom into said body.

12. In a front end loader of the character described, the combination with a motor vehicle of the type having a body adapted to receive material therein and having in front of the body an operator's cab with wheels on opposite sides thereof near the front end thereof, of a loading mechanism comprising a pair of rigid lifting arms each having a rigid end portion pivotally mounted on said vehicle for swingng movements about a substantially horizontal axis located rearwardly of said cab, and each arm having a separate end portion rigid with the first-mentioned end portion and spaced from said pivotal mounting on the vehicle, means for swinging said lifting arms about said axis between a lowered position in which said last-mentioned end portions of said arms extend forwardly to a location below the tops of said wheels and in front of said cab and a raised portion in which said last-mentioned end portions of said arms extend upwardly to a location near the top of said body, each of said arms being of gooseneck configuration such that, in its lowered position, it extends over the top of the adjacent wheel and its front end portion extends downwardly to said location below the top of the wheel and in front of the cab, and means on the front portions of said arms for detachable engagement with a container to lift the container upon swinging movement of the arms and dump the contents therefrom into said body.

13. In a front end loader of the character described, the combination with a motor vehicle of the type having a body adapted to receive material therein and having in front of the body an operator's cab provided with a side door and with wheels on opposite sides thereof near the front end thereof, of a loading mechanism comprising a pair of rigid lifting arms pivotally mounted on said vehicle for swinging movements about a substantially horizontal axis located rearwardly of said cab at a level below the top of said door, means for swinging said lifting arms about said axis between a lowered position in which said arms extend forwardly to a location below the tops of said wheels and in front of said cab and a raised position in which said arms extend upwardly to a location near the top of said body, each of said arms being of an angular configuration such that, in its lowered position, it extends over the top of the adjacent wheel and the adjacent door and its front end portion extends downwardly to said location below the level of the top of the wheel and in front of the cab, and means on the front portions of said arms for detachable engagement with a container to lift the container upon swinging movement of the arms and dump the contents therefrom into said body.

14. In a front end loader of the character described, the combination with a motor vehicle of the type having a body adapted to receive material therein and having in front of the body an operator's cab including a window on one side thereof, of a loading mechanism comprising a pair of rigid lifting arms pivotally mounted on said vehicle for swinging movements about a substantially horizontal axis located rearwardly of said cab at a level below the top of said window, means for swinging said lifting arms about said axis between a lowered position in which said arms extend forwardly to a position in front of said cab and a raised position in which said arms extend upwardly to a position near the top of said body, each of said arms being of a configuration such that, in its lowered position, it extends over said window on the cab and downwardly on opposite sides of said window so as to prevent obstruction of said window when said arms are in their lowered positions, and means on the front portions of said arms for detachable engagement with a container to lift the container upon swinging movement of the arms and dump the contents therefrom into said body.

15. In a front end loader of the character described, the combination with a motor vehicle of the type having a body adapted to receive material therein and having in front of the body an operator's cab including a door on one side thereof, of a loading mechanism comprising a frame having a pair of rigid lifting arms mounted on said vehicle for swinging movement about a substantially horizontal axis located rearwardly of said cab at a level below the top of said door, means for swinging said frame about said axis between a lowered position in which said frame extends forwardly to a location below the top of and in front of said cab and a raised position in which said frame extends upwardly to a location near the top of said body, said frame being of a configuration such that, in its lowered position, it extends past said door on the cab at a level above the top of the door and extends downwardly on opposite sides of said door so as to permit opening and closing of said door when said arms are in their lowered positions, and means on the front portions of said frame for detachable engagement with a container to lift the container upon swinging movement of the frame and dump the contents therefrom into said body.

16. In a front end loader of the character described, the combination with a motor vehicle of the type having a body adapted to receive material therein and having in front of the body an operator's cab including a door on one side thereof, of a loading mechanism comprising a pair of rigid lifting arms mounted on said vehicle for swinging movements about a substantially horizontal axis located rearwardly of said cab at a level below the top of said door, said arms being swingable in vertical planes adjacent opposite sides of said cab, means for swinging said lifting arms simultaneously about said axis between a lowered position in which said arms extend forwardly to a location below the top of and in front of said cab and a raised position in which said arms extend upwardly to a location near the top of said body, each of said arms being of a configuration such that, in its lowered position, it extends past said door on the cab at a level above the top of the door and extends downwardly on opposite sides of said door so as to permit opening and closing of said door when said arms are in their lowered positions, and means on the front portions of said arms for detachable engagement with a container to lift the container upon swinging movement of the arms and dump the contents therefrom into said body.

17. In a front end loader of the character described, the combination with a motor vehicle of the type having a body adapted to receive material therein and having in front of the body an operator's cab including a door on one side thereof, of a loading mechanism comprising a pair of rigid lifting arms mounted on said vehicle for swinging movements about a substantially horizontal axis located rearwardly of said cab at a level below the top of said door, said arms being swingable in vertical planes adjacent opposite sides of said cab, means for swinging said lifting arms simultaneously about said axis between a lowered position in which said arms extend forwardly to a location below the top of and in front of said cab and a raised position in which said arms extend upwardly to a location near the top of said body, each of said arms being of a gooseneck configuration such that, in its lowered position, it extends past said door on the cab at a level above the top of the door and extends downwardly on opposite sides of said door so as to permit opening and closing of said door when said arms are in their lowered positions, and means on the front portions of said arms for detachable engagement with a container to lift the container upon swinging movement of the arms and dump the contents therefrom into said body.

18. In a front end loader of the character described, the combination with a motor vehicle of the type having a body adapted to receive material therein and having in front of the body an operator's cab including a door on one side thereof, of a loading mechanism comprising a pair of rigid lifting arms mounted on said vehicle for swinging movement about a substantially horizontal axis located rearwardly of said cab at a level below the top of said door, means for swinging said lifting arms simultaneously about said axis between a lowered position in which said arms extend forwardly to a location below the top of and in front of said cab and a raised position in which said arms extend upwardly to a location near the top of said body, each of said lifting arms being of a configuration such that, in its lowered position, it extends past said door on the cab at a level above the top of the door and extends downwardly on opposite sides of said door so as to permit opening and closing of said door when said arms are in their lowered positions, pick-up arms supported by the front portions of said lifting arms for detachable engagement with a container, and power means for swinging said pick-up arms relative to said lifting arms.

19. In a front end loader of the character described, the combination with a motor vehicle of the type having a body adapted to receive material therein and having in front of the body an operator's cab including a door on one side thereof, of a loading mechanism comprising a pair of rigid lifting arms mounted on said vehicle for swinging movement about a substantially horizontal axis located rearwardly of said cab at a level below the top of said door, means for swinging said lifting arms simultaneously about said axis between a lowered position in which said arms extend forwardly to a location below the top of and in front of said cab and a raised position in which said arms extend upwardly to a location near the top of said body, each of said lifting arms being of a configuration such that, in its lowered position, it extends past said door on the cab at a level above the top of the door and extends downwardly on opposite sides of said door so as to permit opening and closing of said door when said arms are in their lowered positions, a separate container, pick-up arms supported by the front portions of said lifting arms for detachable engagement with said container, and power means for swinging said pick-up arms relative to said lifting arms.

20. In a front end loader of the character described, the combination with a motor vehicle of the type having a body adapted to receive material therein and having in front of the body an operator's cab, of loading means comprising a frame pivotally mounted on said vehicle for swinging movements about a substantially horizontal axis located rearwardly of said cab, means for swinging said frame about said axis between a lowered position in which said frame extends forwardly to a position in front of said cab and a raised position in which said frame extends upwardly to a position near the top of said body, a separate container having elongated channels on the ends thereof, and fork arms mounted on the front portion of said frame spaced apart a greater distance than the length of the container and embracing the container to engage detachably the channels of said container and to lift the container upon swinging movement of the frame and dump the contents therefrom into said body.

21. In a front end loader of the character described, the combination with a motor vehicle of the type having a chassis frame, a body on the frame adapted to receive material therein and an operator's cab on the frame in front of the body, of a loading mechanism comprising a pair of rigid lifting arms pivotally mounted on said vehicle for swinging movements about a substantially horizontal axis located rearwardly of said cab at a level below the top of said cab, means for swinging said lifting arms simultaneously about said axis between a lowered position in which said lifting arms extend forwardly to a location in front of said cab and a raised position in which said arms extend upwardly to a location near the top of said body, a torque tube rotatably mounted on and extending between the front end portions of said lifting arms, said torque tube being located in front of said cab substantially at the level of the chassis frame in the lowered position of said lifting arms, fork arms mounted on said torque tube for detachable engagement with a container disposed in front of said cab for lifting the container upon swinging movement of said lifting arms, and power cylinders mounted solely on the lifting arms and operatively connected with the torque tube for turning the torque tube to move the fork arms relative to the lifting arms.

22. In a front end loader of the character described, the combination with a motor vehicle of the type having a chassis frame, a body on the frame adapted to receive material therein and an operator's cab on the frame in front of the body, of a loading mechanism comprising a pair of rigid lifting arms pivotally mounted on said vehicle for swinging movements about a substantially horizontal axis located rearwardly of said cab at a level below the top of said cab, means for swinging said lifting arms simultaneously about said axis between a lowered position in which said lifting arms extend forwardly to a location in front of said cab and a raised position in which said arms extend upwardly to a location near the top of said body, a torque tube rotatably mounted on and extending between the front end portions of said lifting arms, said torque tube being located in front of said cab substantially at the level of the chassis frame in the lowered position of said lifting arms, fork arms mounted on said torque tube for detachable engagement with a container disposed in front of said cab for lifting the container upon swinging movement of said lifting arms, and power cylinders mounted solely on the lifting arms and operatively connected with the torque tube for turning the torque tube to move the fork arms relative to the lifting arms, each power cylinder including a cylinder and piston rod assembly mounted at one end on the lifting arm and having a link connection at the opposite end thereof with the torque tube.

23. In a front end loader of the character described, the combination with a motor vehicle of the type having a chassis frame, a body on the frame adapted to receive material therein and an operator's cab on the frame in front of the body, of a loading mechanism comprising a pair of rigid lifting arms pivotally mounted on said vehicle for swinging movements about a substantially horizontal axis located rearwardly of said cab at a level below the top of said cab, means for swinging said lifting arms simultaneously about said axis between a lowered position in which said lifting arms extend forwardly to a location in front of said cab and a raised position in which said arms extend upwardly to a location near the top of said body, a torque tube rotatably mounted on and extending between the front end portions of said lifting arms, said torque tube being located in front of said cab substantially at the level of the chassis frame in the lowered position of said lifting arms, fork arms mounted on said torque tube for detachable engagement with a container disposed in front of said cab for lifting the container upon swinging movement of said lifting arms, power cylinders mounted solely on the lifting arms and operatively connected with the torque tube for turning the torque tube to move the fork arms relative to the lifting arms, each power cylinder including a cylinder and piston rod assembly mounted at one end on the lifting arm and having a link connection at the opposite end thereof with the torque tube, and means carried by the lifting arm and having guiding relation with the piston rod of the cylinder for holding the piston rod and cylinder in operative relation to the lifting arm.

24. In a front end loader of the character described, the combination with a motor vehicle of the type having a chassis frame, a body on the frame adapted to receive material therein and an operator's cab on the frame in front of the body, of a loading mechanism comprising a pair of rigid lifting arms pivotally mounted on said vehicle for swinging movements about a substantially horizontal axis located rearwardly of said cab at a level below the top of said cab, means for swinging said lifting arms simultaneously about said axis between a lowered position in which said lifting arms extend forwardly to a location in front of said cab and a raised position in which said arms extend upwardly to a location near the top of said body, a torque tube rotatably mounted on and extending between the front end portions of said lifting arms, said torque tube being located in front of said cab substantially at the level of the chassis frame in the lowered position of said lifting arms, fork arms mounted on said torque tube for detachable engagement with a container disposed in front of said cab for lifting the container upon swinging movement of said lifting arms, and power cylinders mounted solely on the lifting arms and operatively connected with the torque tube for turning the torque tube to move the fork arms relative to the lifting arms, each power cylinder including a cylinder and piston rod assembly mounted at one end on the lifting arm and having a link means at the opposite end thereof with the torque tube, said link means including gearing connecting the cylinder with the torque tube.

References Cited in the file of this patent

UNITED STATES PATENTS

| | | |
|---|---|---|
| 2,119,139 | Owen | May 31, 1938 |
| 2,565,792 | Wagner et al. | Aug. 28, 1951 |
| 2,606,417 | Richey | Aug. 12, 1952 |
| 2,690,272 | Quayle | Sept. 28, 1954 |
| 2,711,256 | Cutler | June 21, 1955 |
| 2,731,162 | Walstrom | Jan. 17, 1956 |
| 2,744,642 | Sewell et al. | May 8, 1956 |
| 2,778,513 | Braun | Jan. 22, 1957 |
| 2,808,161 | Gentile | Oct. 1, 1957 |
| 2,819,874 | Belec | Jan. 14, 1958 |
| 2,824,032 | Harbers | Feb. 25, 1958 |
| 2,828,032 | Beasley et al. | Mar. 25, 1958 |
| 2,885,101 | Aldredge et al. | May 5, 1959 |

UNITED STATES PATENT OFFICE
CERTIFICATE OF CORRECTION

August 18, 1959

Patent No. 2,900,096

George R. Dempster et al.

It is hereby certified that error appears in the printed specification of the above numbered patent requiring correction and that the said Letters Patent should read as corrected below.

Column 11, lines 46 and 47, strike out "a separate container having connection means on the ends thereof," and insert the same after "arms," in line 44, same column; column 12, line 74, for "portion" read -- position --.

Signed and sealed this 26th day of April 1960.

(SEAL)
Attest:

KARL H. AXLINE
Attesting Officer

ROBERT C. WATSON
Commissioner of Patents